July 27, 1954   J. E. JOHANSSON   2,684,737
FRICTION CLUTCH AND GEAR WHEEL ASSEMBLY
Filed Dec. 27, 1950
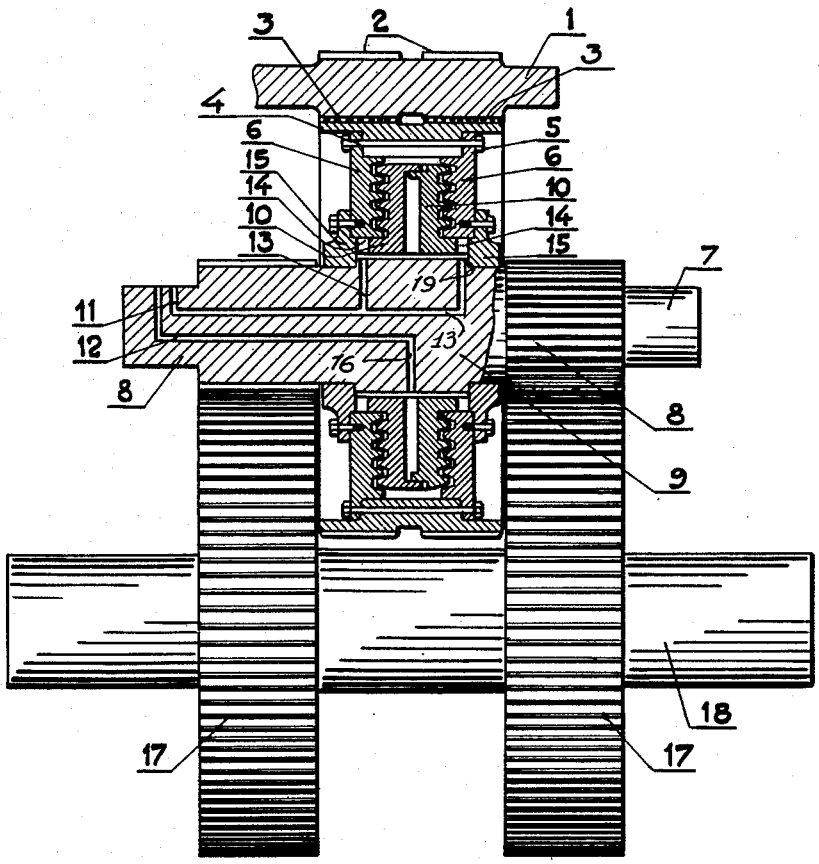
Inventor
Johan Erik Johansson
By
Cushman, Darby & Cushman
Attorneys Patented July 27, 1954

2,684,737

UNITED STATES PATENT OFFICE 2,684,737

FRICTION CLUTCH AND GEAR WHEEL ASSEMBLY

Johan Erik Johansson, Goteborg, Sweden, assignor to Aktiebolaget Gotaverken, Goteborg, Sweden, a corporation of Sweden Application December 27, 1950, Serial No. 202,876

Claims priority, application Sweden December 31, 1949

3 Claims. (Cl. 192—20)

This invention relates to friction clutch and gear wheel assembly of the type in which a clutch is disposed within a hollow gear wheel and in which two axially displaceable clutch discs are adapted to be actuated by a fluid under pressure for engagement with the lateral parts of the hollow gear wheel. In previously known constructions, the lateral parts of the gear wheel are rigidly connected with the gear rim, resulting in a limitation of the field of use of the clutch, it being difficult to arrange such clutches in the most suitable manner.

It is the object of the present invention to provide an assembly permitting of the transmission of great torques.

I attain this object by mechanism illustrated in the annexed drawing in which there is illustrated one form of construction according to the invention. The assembly illustrated may be used in transmission means between a high speed engine shaft and a drive shaft for a vehicle, for instance between a turbine shaft and the drive shaft of a locomotive.

In the drawing, numeral 1 denotes a shaft which may be directly connected to the shaft of a turbine. The shaft 1 and two gear rims 2 are formed in a single piece. The gear rims 2 engage two gear ribs 3 which are rigidly connected to each other and by means of bolts 4 and nuts 5 are secured to discs 6 constituting the lateral parts of a gear wheel.

On a shaft 7 there are formed two pinions 8, and between these pinions there is provided a portion 9 having a greater diameter than the outer diameter of the pinions 8. The portion 9 is splined and has mounted thereon two clutch discs 10 which are axially displaceable on the shaft 7 but not rotatable relative thereto.

The lateral parts 6 and the clutch discs 10 are provided with annular projections and recesses adapted to cooperate with each other so as to transmit power upon being engaged with each other. The shaft 8 has passages 11 and 12, the passage 11 communicating with two branch passages 13 opening into spaces 14 between the hubs of the clutch discs 10 and rings 15 which are bolted to the lateral gear wheel parts 6 and the inner diameter of which is smaller than the inner diameter of the parts 6. The passage 12 communicates with a passage 16 which opens into the space between the two clutch discs 10.

In order to render possible the use of the clutch consisting of the parts 6 and the discs 10, in the construction illustrated and adapted for the transmission of comparatively great torques, the parts 6 and the discs 10 have such great inner diameters as to be able to be passed over the pinions 8. To obtain sufficient sealing between the parts 6 and the shafts 7, the rings 15 are provided, these rings being suitably split and may consist of two halves which are suitably secured to the parts 6.

The rings 15 may consist of a suitable metal and constitute bearings for the wheel consisting of the parts 6 and the gear rims 3. This wheel is maintained in axial position by the enlarged portion 19 of the shaft 7. If desired, the split rings 15 may be made of steel and mounted on the shaft 7 by means of suitable bushings.

The pinions 8 cooperate with gear wheels 17 on a shaft 18 which may constitute the drive shaft of a locomotive. The gear wheels 17 may cooperate with further gear wheels running in opposite direction with respect to the pinions 8 for reversing the direction of running of the locomotive. In this case, a further shaft corresponding to shaft 7 and a second clutch of the type described above may be provided.

If fluid under pressure is supplied to the passages 12 and 16, the clutch discs 10 will be forced from each other into engagement with the parts 6. If fluid under pressure is supplied to the passages 11 and 13, the discs 10 will be forced against each other so as to disengage the clutch, suitable drain pipes for the fluid being provided on either side of the clutch discs 10.

Due to the construction described, friction clutches of the type in which clutch discs are disposed within a hollow gear wheel may be used for the transmission of great torques, since the lateral parts of the gear wheel can be passed over the pinions on the shaft which transmits power to the driven members, such as the wheels of a vehicle. In view of the fact that the gear wheel parts 6 are subject to great wear, it is desirable that said parts which are comparatively cheap in manufacture, should be exchangeable, whereas the expensive gear rims 3 need not be exchanged. Each ring 15 may consist of two or more parts devised as sealing members for the spaces 14 to which fluid under pressure is supplied for disengaging the clutch. A suitable valve device may be provided for controlling the fluid for engaging and disengaging the clutches for reversing the locomotive or other vehicle. Such valve device should also be adapted to disengage the driving engine entirely from the drive shaft 18 so that the vehicle may be hauled when having all transmission members between the engine and the drive shaft 18 put out of gear.

What I claim is:

1. A friction clutch and gear wheel assembly comprising a shaft, two pinions integral with said shaft, a gear wheel mounted on said shaft between said pinions, said gear wheel consisting of lateral parts having central openings, and a gear rim connected with said lateral parts, said openings having a greater diameter than said pinions, two rings each consisting of at least two portions detachably secured to the edges of the central opening of said lateral parts, said rings at least indirectly bearing against said shaft, two clutch discs disposed between said lateral parts, each of said discs having a face for frictional engagement with one of said lateral parts, and means supplying fluid under pressure to said discs to force the discs into or out of engagement with said lateral parts.

2. A friction clutch and gear wheel assembly comprising a shaft, two pinions integral with said shaft, a gear wheel mounted on said shaft between said pinions, said gear wheel consisting of lateral parts having central openings, and a gear rim connected with said lateral parts, said openings having a greater diameter than said pinions, two rings consisting of at least two portions detachably secured to the edges of the central openings of said lateral parts, said rings bearing against said shaft, two clutch discs disposed between said lateral parts, each of said discs having a face for frictional engagement with one of said lateral parts, and means supplying fluid under pressure to said discs to force the discs into or out of engagement with said lateral parts, said rings bearing against said shaft in a fluid-tight manner.

3. A friction clutch and gear wheel assembly comprising a shaft, two pinions integral with said shaft, a gear wheel mounted on said shaft between said pinions, said gear wheel consisting of lateral parts having central openings, and a gear rim connected with said lateral parts, said openings having a greater diameter than said pinions, two rings each consisting of at least two portions detachably secured to the edges of the central openings of said lateral parts, said rings at least indirectly bearing against said shaft, two clutch discs disposed between said lateral parts, each of said discs having a face for frictional engagement with one of said lateral parts, means supplying fluid under pressure to said discs to force the discs into or out of engagement with said lateral parts, and an enlarged portion on said shaft between said rings adapted and arranged to guide said gear wheel in axial direction.

References Cited in the file of this patent

UNITED STATES PATENTS

| Number | Name | Date |
| --- | --- | --- |
| 1,472,930 | Mayer | Nov. 6, 1923 |
| 2,559,337 | Balmforth | July 3, 1951 |